Figure 1:
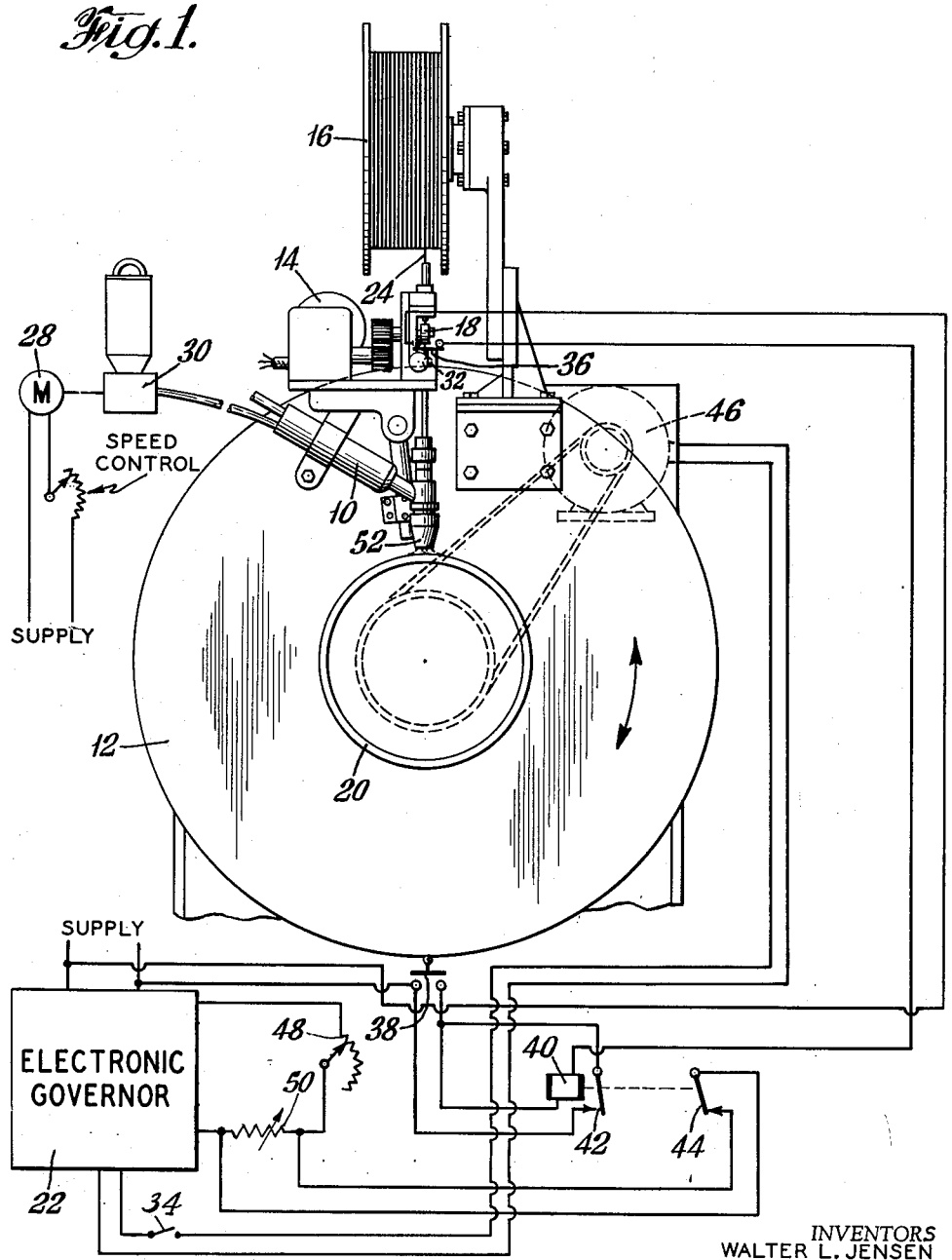

Oct. 24, 1961   W. L. JENSEN ET AL   3,005,899
METAL ARC WELDING, COMPOSITION, AND APPARATUS
Filed Dec. 30, 1958   4 Sheets-Sheet 2

INVENTORS
WALTER L. JENSEN
RALPH P. PHILLIPS
GERARD E. CLAUSSEN

BY *William F. Mesinger*
ATTORNEY

Oct. 24, 1961 W. L. JENSEN ET AL 3,005,899
METAL ARC WELDING, COMPOSITION, AND APPARATUS
Filed Dec. 30, 1958 4 Sheets-Sheet 4
*Fig. 4.*
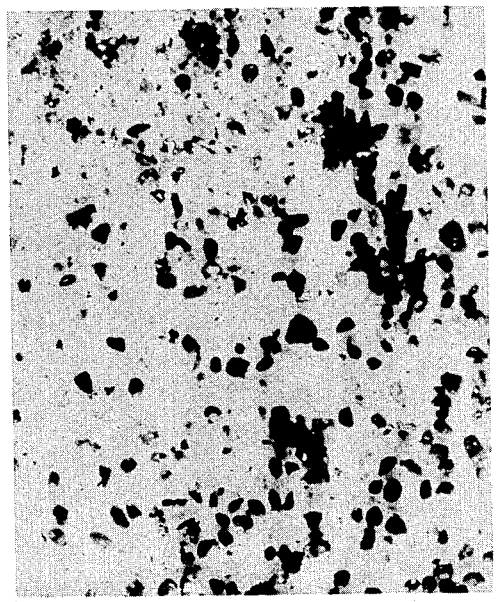
FLUX NO. 472-11 (20X)
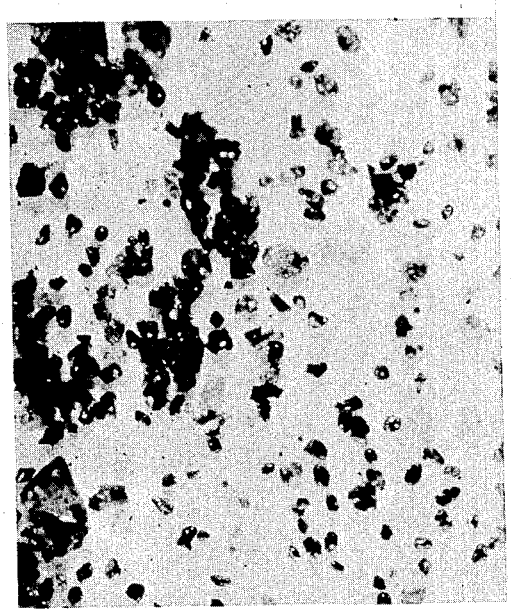
FLUX NO. 437-75 (20X)
*Fig. 5.*
INVENTORS
WALTER L. JENSEN
RALPH P. PHILLIPS
GERARD E. CLAUSSEN
BY Barnwell R. King
ATTORNEY United States Patent Office 3,005,899
Patented Oct. 24, 1961

3,005,899
METAL ARC WELDING, COMPOSITION, AND APPARATUS
Walter L. Jensen, River Edge, Ralph P. Phillips, Colonia, and Gerard E. Claussen, Summit, N.J., assignors to Union Carbide Corporation, a corporation of New York
Filed Dec. 30, 1958, Ser. No. 783,945
6 Claims. (Cl. 219—60)

This invention relates to metal arc welding and more particularly to all-position, high-current-density, slag producing, gas-borne-powder-shielded, visible, work-in-circuit, metal arc welding.

According to the invention there is provided a novel process of such welding, which may be called plasmic welding, in which the shape and rate of freezing of the weld puddle are controlled through the addition of relatively cold welding composition thereto, improving the surface appearance of the resulting weld bead, even with an inexpensive metal wire electrode, and in all-position.

The method and apparatus of the invention are especially suitable for mechanized welding overland pipelines. While the procedure of mechanized welding, according to the invention, is an element of novelty, a still more important novel element relates to physical characteristics of the welding composition particulates. There is a critical relationship between both the welding composition particle size, composition density, and the shielding-conveying gas velocity. A range of 32 x D to 48 x D is preferable.

While the primary object of the invention is to solve problems involved in all-position welding of the type referred to above, another object of the invention is the provision of apparatus for translating the welding torch circularly about the pipe workpiece in a path concentric with respect to the longitudinal axis of said pipe. A further object is to provide a novel electrical circuit for automatically controlling the motion of such apparatus.

According to the invention there is provided a novel non-magnetic slag-forming welding composition composed essentially of 20–65% titanium dioxide, 5–40% slag modifiers selected from the class consisting of $Al_2O_3$, MgO, $MnO_2$, $ZrO_2$, CaO, $Na_2O$, $SiO_2$, and fluoride (such as sodium aluminum fluoride, calcium fluoride, potassium silicon fluoride, and other alkali and alkaline earth fluorides), 15–40% deoxidizing metal selected from the class consisting of silicon, and ferro-silicon, manganese, ferro-manganese, and alloys thereof.

Further, according to the invention there is provided a novel process of all-position gas-flux shielded metal arc welding, which comprises striking a welding arc between a fusible metal electrode and the work to be welded, shielding such arc and adjacent metal with selected gas carrying such composition in the form of a fluidized powder and fusing such welding composition, said electrode, and the adjacent work metal with such arc to form a bead of weld metal containing some of the components of such composition, leaving a removable slag that covers such bead of weld metal.

More particularly, according to the invention, there is provided a novel process of all-position welding a circular workpiece, which comprises striking a welding arc between a fusible metal electrode and such workpiece. The arc is energized through suitable cables, while shielding such arc with gas-borne powdered welding composition, supplied through suitable hose. The electrode is moved completely about such workpiece and simultaneously fed toward such arc in the direction of the longitudinal axis thereof, while supplying such electrode from a reel that is also similarly moved about the workpiece therewith. Upon the completion of such movement the operation is stopped, slag is cleaned from the resulting weld, and a welding arc is struck between said fusible metal electrode and such weld, and the welding operation is repeated in reverse by moving the electrode reel completely about the workpiece in a direction opposite that of the first weld, thereby unwinding the connecting cables and hose while completing the second welding pass.

Apparatus of the invention includes the combination of a gas-flux shielded metal arc welding torch, and a carriage for said torch. The carriage is guided by suitable means around the pipe to be welded with the extended longitudinal axis of the torch substantially intersecting the axis of such pipe. Means are provided for feeding a fusible metal wire electrode through such torch including a wire feed motor mounted on said carriage as well as means including a flux feed motor for feeding non-magnetic fluidized welding composition powder in a suitable shielding gas stream through such torch, and around such wire electrode to concentrate the gas and powder about the electrode as they emerge from such cup. A carriage drive motor is provided for moving said carriage around said pipe. The speed of said carriage is controlled in predetermined arcs in its course about the pipe by suitable means so that it moves at a faster rate when moving down compared to going up around the pipe. Means are also provided for changing the speed of said flux feed motor to change the amount of welding composition that is fed to the torch at selected points in the travel of the latter about the pipe.

Figure 2:
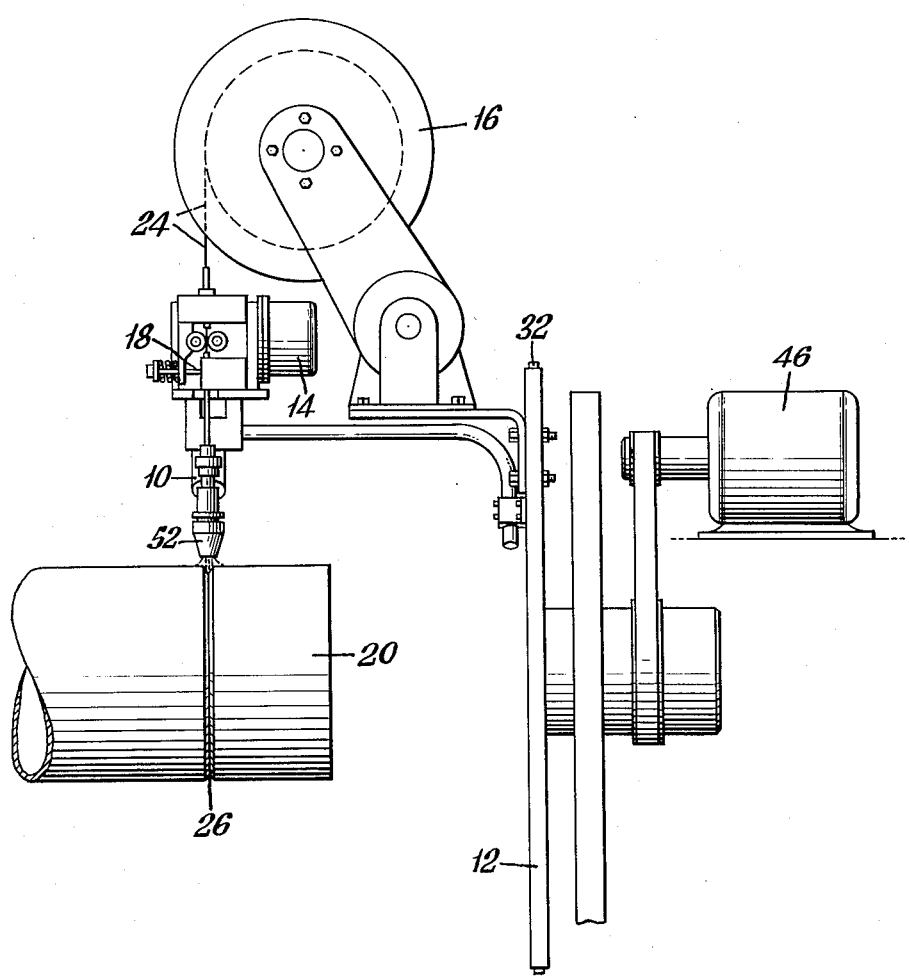
Figure 3:
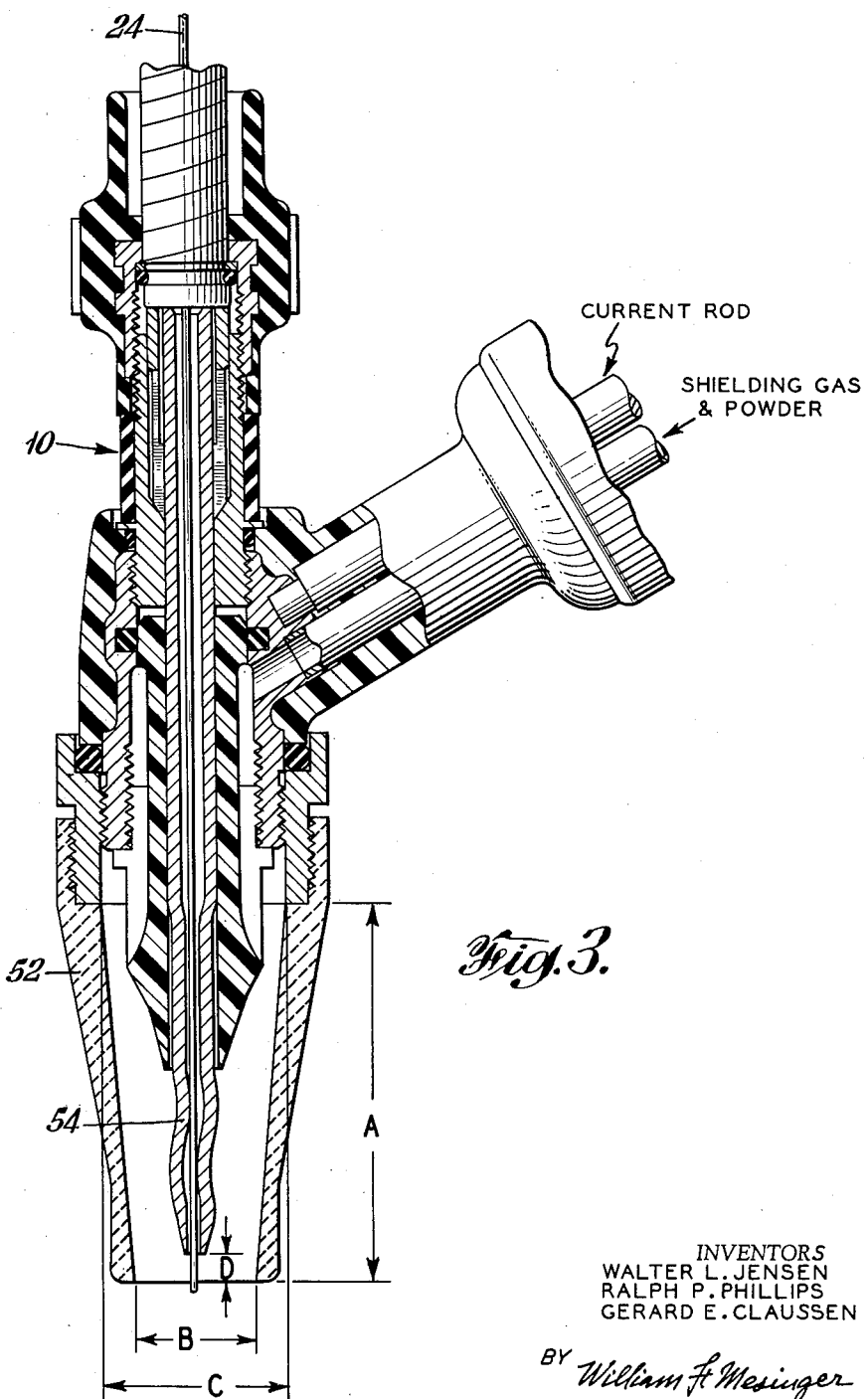

In the drawings:
FIG. 1 is a fragmentary view, mainly in elevation, of apparatus including a circuit diagram illustrating the invention;
FIG. 2 is a view in side elevation of the apparatus;
FIG. 3 is a fragmentary view, mainly in vertical cross-section of the torch; and
FIGS. 4 and 5 are pictures of greatly enlarged welding composition particles of the invention.

As shown in FIG. 1 a welding torch 10 and its accessories are fixed to a rotatable mounting plate 12. It will be understood from the drawing that the assembly comprising the torch, welding-wire-feed motor 14, wire reel 16 and a wire-feed mechanism 18 are attached permanently to the mounting plate 12 which has its center of rotation coincident with the axis of a pipe workpiece 20. A unique aspect of the improvement described herein provides for aligning the torch nozzle axis radially with respect to the center of rotation of the plate, and either normal to the pipe axis or inclined at some angle to the pipe axis.

Operation of the welding equipment illustrated is initiated by closing a reversible switch (not shown) associated with a conventional electronic governor 22 such as that described in Lobosco Patents No. 2,334,789 and No. 2,559,724, and by closing a welding switch (not shown). Closure of the reversible switch energizes the carriage drive motor 46 to cause rotation of the mounting plate 12, said mounting plate being equipped with the wire feed motor 14 to feed and regulate the speed of welding wire 24 by means of the feed roll device 18 through the welding torch 10 to the circumferential weld joint 26 on the workpiece 20. After the torch has been rotated to the desired welding position (usually but not necessarily the 12 o'clock position), the welding switch is closed as a result of which the following four principal functions occur to:

(1) Energize the wire feed motor 14.
(2) Connect a conventional source (DC-SP) of welding power to the torch and workpiece.
(3) Energize a solenoid (not shown) to turn on a supply of shielding gas such as carbon dioxide which fluidizes the flux and acts as a shielding medium.

(4) Energize a motor 28 to drive a flux dispenser 30.

The following variations of the above equipment operation description are possible and have been used for a complete 360 degree weld.

(1) Constant rotational speed, flux rate, and wire feed rate.

(2) Variable rotational speed, flux rate, and wire feed rate.

(3) Variable rotational speed and flux rate, but constant wire feed rate.

(4) Variable rotational speed and wire feed rate, but constant flux rate.

The flux rate and wire feed rate regulation may be automated by means of mechanisms similar to either of those suggested below for regulating the carriage rotational speed.

Projection 32 on the periphery of the welding fixture is so located that it will actuate normally closed limit switch 36 in the 12 o'clock position and actuate normally open limit switch 38 in the 6 o'clock position. As switch 34 is closed, power is supplied to drive motor 46, which rotates the fixture in the desired direction at a down welding speed predetermined by the setting of potentiometer 48. As projection 32 moves, limit switch 36 closes completing a hold circuit for relay 40 comprised of limit switch 36, normally open contact 42. As the machine proceeds downward at a predetermined down welding speed to 6 o'clock projection 32 operates limit switch 38 completing a supply circuit to relay 40. Relay 40 operates and it is held in by its own normally open contact 42 after limit switch 38 returns to its normally open position. Normally closed contact 44 opens inserting variable resistance 50 in series with potentiometer 48, thereby decreasing the up welding speed. As projection 32 completes 360 degree rotation, it again actuates limit switch 36, thereby dropping out relay 40 returning motor 46 to its original down welding speed. This sequence of operation works equally well for either direction of rotation.

A variation of such method of speed changing for various weld thicknesses and pipe diameters for example would permit the addition of a number of projections to actuate additional limit switches connected to suitable speed change potentiometers, thus giving more speed changes during the welding cycle. Another variation desirable for the first one or two passes consists of eliminating all speed variation and making a 360 degree weld at a constant speed. A variation of speed changing mechanism is one having a cam on the periphery of the welding fixture, such cam being so shaped as to progressively regulate the rotational speed of the torch by means of a potentiometer operated through a rack and pinion from movement of a rider on the cam.

FIG. 3 illustrates the novel torch 10 of the invention, such torch producing, in combination with other factors, the unexpected results described later herein. Referring to FIG. 3, the following sizes of cup 52 have been used.

*Cup dimensions*

|  | A (Effective Internal Length), in. | B (Throat Diameter), in. | C (Inlet Diameter), in. |
| --- | --- | --- | --- |
| Cup No. 1 | 1⅜ | ½ | ⅞ |
| Cup No. 2 | 1 7/16 | ⅝ | ⅞ |
| Cup No. 3 | 1½ | ¾ | ⅞ |

With a ¾ in. cup-to-work distance, the dimension D, the distance between the end of contact tube 54 and the end of cup 52, FIG. 3, may be varied from 0 to ½ in. but the preferred dimension D is ⅛ in.

All three cup sizes have been used successfully according to the invention, but the preferred size is No. 2. Cup No. 1 is the more economical of the three as to shielding gas and flux because of its smaller "B" dimension, but it has the disadvantage of not providing adequate flux delivery to the arc if the welding wire is slightly curved and thus not centered in the flux column. The economy of No. 1 cup may be realized when there is developed a positive wire straightening device for such small diameter wire so as to keep the wire centered in the column of fluidized flux. No. 3 cup is large enough to provide adequate coverage even when the welding wire is somewhat curved, but such cup size requires a higher flux and gas flow rate which in turn is uneconomical.

A slight reverse bend is provided in the lower end of contact tube A–54 to insure continuous electrical contact with the wire electrode.

The shielding gas and flux mixture enters the top of the cup 52 shown in FIG. 3, near its inside periphery. Said cup is so designed that when the mixture leaves the bottom of the cup the flux is properly distributed and concentrated with respect to the welding wire. Thus the cup dimension A must be great enough so that smooth, non-swirling flow obtains.

Initially, prior to the invention, interest lay in determining whether a weld puddle could be maintained at all positions around a pipe. It was decided to begin the investigation by locating a conventional torch in fixed positions and rotating the pipe. Initial results were in general poor. Much of the difficulty was believed to be related to too large a wire diameter. Considerable difficulty was experienced with such equipment. Typical difficulties were wire hangup in the guide tube and clogging of the cup with flux.

In re-building the fixture, the torch was mounted on a rotating positioner and the flexible conduit was changed to one of 17 ft. length. A section of 10½ inch diameter pipe 1 ft. long was mounted with the pipe axis horizontal, and the torch was positioned so that it cleared the pipe by ¾ inch. Successful welds were made welding down from twelve to six o'clock, but dripping of the weld metal usually occurred when welding up from six to twelve o'clock. One of the difficulties was arc instability associated with the long flexible conduit. Therefore, the length of the conduit was reduced to 7 ft. Such length was just sufficient to permit one revolution of the torch.

Such arrangement improved the arc action somewhat but left much to be desired. The flux tended to accumulate in the cup when welding from seven o'clock to nine o'clock which resulted in insufficient flux at the arc. As welding proceeded from eleven to twelve o'clock accumulated flux poured from the cup so as to completely submerge the arc. The present cup, FIG. 3, prevents accumulation of flux in the cup.

Tests with the vertical-down welding setup indicated that welding in the down direction would not be a serious problem. Rather, it was believed this down-welding could be accomplished by welding fast enough to stay ahead of the welding puddle. The up-welding was the serious problem. In up-welding, prior to the invention, the arc tended to dig into the work causing dripping and cutting of the metal. This digging arc resulted in a cut of width about the size of a wire diameter. It was relatively easy to cut through a ¼ inch thick pipe with about 250 amperes on 0.030 inch diameter wire, such action being undesirable. The digging arc appeared to be associated with current density and flux distribution. An attempt was made to determine the proper flux-to-wire ratio, but it was difficult to get proper flux distribution.

In welding from seven o'clock to nine o'clock in the up direction, the flux supply was inadequate because the flux tended to accumulate in the cup. As welding proceeded from ten o'clock to eleven o'clock, this accumulated flux drained from the cup, completely submerging the arc. When the flux supply was inadequate, the arc was of a digging type and when the flux supply was too great, the submerged arc gave a high narrow bead. The prevention of flux from accumulating in the cup seemed to be a major problem. Increasing the carbon dioxide gas flow helped in solving this problem but by no means eliminated it.

A second step in smoothing the flux flow was the modified cup. Initially, there was obtained a smooth tapered contour by filling all of the irregularities with ceramic cement. Such new contour improved flux flow uniformity so this idea was refined by having the inside of a cup rebored so as to eliminate irregularities in which flux might accumulate.

An attempt was made to explore higher carbon dioxide shielding gas velocities, but it was difficult to see what was happening to the flux with relation to the wire. It seemed, with high carbon dioxide velocities, that the flux was traveling too fast and thus, left the arc region without being consumed. In an effort to bring all the flux into the arc zone, a standard cup was sealed off with fiberglass and redrilled with a small hole. Various size holes up to ¼ in. diameter were tried but such cup modification aggravated the flux accumulation condition by increasing such accumulation rate when welding overhead.

In studying the cup problem, it was decided to try all of the standard cup sizes. The larger sizes worked better than the smaller ones. Best results were obtained with a standard cup, ½ in. I.D. which had been modified by boring out to ⅝ in. I.D. experimental welds made with flux No. 432—75 (see below) which was similar in composition to flux No. 472—11 (see below) but included magnetic components, indicated the following clues to a solution of the all-position welding problem. For example, it was much finer than fluxes tested heretofore (mesh analysis). This finer flux seemed to issue from the nozzle uniformly dispersed throughout the gas stream. Tests indicated that it was important to keep the wire near the center of the flux stream.

The operation of the arc at this point was sporadic. Sections of some welds were excellent, while much of the remainder was very poor. The problem of flux collecting in the cup recurred continually. At this point, a notch was cut in the cup on the down side, in the hope that accumulated flux could drop out. In this respect, the notch was not successful, but the results contributed an important clue to the present invention. The notch opening provided visibility to see what was happening inside the cup during welding. As welding progressed, the heavier flux particles accumulated at the end of the contact tube thus effectively reducing the cup size.

There was a tendency for such heavier material to be sintered by spatter and/or the heat of the arc. At this point, it was decided that, since the flux was being introduced uniformly dispersed in the carbon dioxide and since the heavier flux constituents accumulated in the contact tube so as to disrupt proper conveyance of the flux, it was decided to continue the tests using a modified flux in which the heavier constituents such as magnetite and iron powder were not present. The completely nonmagnetic flux, containing neither magnetite nor iron powder, produced an unexpected improvement in flux delivery to the arc. This experimental batch of flux was designated No. 472—11 (see below).

At this point, it was decided to try a larger wire diameter, hoping thereby to be able to use more current and thus weld faster. It was possible to use a ³⁄₆₄ in. diameter wire and deposit a continuous weld bead, but operation was not as good as had been obtained with 0.030 in. diameter wire. It was decided, therefore, to continue the investigation with the latter wire diameter.

It was decided to use flux No. 472—11 for further investigation. This flux gave a weld puddle which was even more viscous than flux No. 437—75. However, with either of these fluxes, satisfactory arc operation was characterized by a crisp crackling sound while poor arc operation (digging arc and dripping metal) was characterized by a softer, smoother hissing sound. It is usually possible to detect unsatisfactory arc operation without watching the weld merely by the sound of the arc.

A second batch of flux No. 472—11, made to duplicate the original batch, performed as well as the original batch. However, a third lot seemed to have a coarser particle size. The following mesh analysis was made of the original batch No. 472—11 and also of flux No. 437—75.

*Mesh Analysis*

[percent fractions]

| Mesh | Flux No. 472—11 | Flux No. 437—75 |
| --- | --- | --- |
| +24 | | |
| −24 +32 | | .02 |
| −32 +48 | 1.82 | 7.43 |
| −48 +65 | 6.16 | 11.09 |
| −65 +100 | 15.58 | 14.56 |
| −100 +150 | 45.70 | 33.35 |
| −150 +200 | 14.43 | 11.40 |
| −200 | 16.85 | 22.20 |
| Total | 100.54 | 100.05 |

It was found that flux No. 437—75 was about mesh size 48 x D so that this third batch No. 472—11 was reground to 48 x D. Performance with this reground flux was comparable to the original batch. A fourth batch also flux No. 472—11 was prepared with mesh size 32 x D, but this sizing necessitated modification of the welding conditions in order to get satisfactory performance. To get good welds of the proper contour required about a 30% reduction in welding speed.

As previously indicated, the torch was being traversed around the circular workpiece, a 10 in. diameter, ¼ in. wall thickness, mild steel pipe. The welding preparation for such workpiece was a 60° included V. Thus, V preparation for welding was 60° included angle having a depth of approximately ³⁄₁₆ in. This joint could be filled flush with weld metal by making one pass around the pipe. A second pass could be added for reinforcement and, with the accomplishment of this second pass, it was believed that the most difficult step had been accomplished. That is to say, the weld bead deposited without the added support of the V walls was the severest condition.

After having applied the process of the invention successfully to the welding of the aforementioned welding preparation in 10 in. diameter pipe, it was decided to apply these same welding conditions and similar welding preparations to the welding of a larger V in 18 in. diameter pipe, said pipe having a wall thickness of approximately ½ inch, and said included V being 60°, this V being machined into the pipe to a depth of approximately ⁷⁄₁₆ inch. First attempts to apply the best known welding procedure to such 18 inch pipe were a failure. The difficulty was related either to the large pipe diameter which had to be traversed by both the torch and flexible cable, or to the funneling action of the tapered walls of the V which tended to introduce more flux to the welding arc. That is to say that, in the 10 inch diameter pipe V, since it presented a smaller area for the flux to be accepted into the welding puddle, the given amount of said flux would perform its normal function. However, on going to the larger V, using the same overall flux flow as was used on the 10 in. diameter pipe, appreciably more flux was directed into the welding puddle.

In order to separate such variables, the 10 in. diameter pipe was used where the welds could be made successfully as before. To determine the effect of the 18 in. diameter, it was decided to use a 10 in. pipe with a ¾ in. wall which provided for a V groove about ⅝ in. deep. After some readjustment of flux flow, it was possible to complete a weld in this deep groove with about 15 passes. The information thus gained from these latter welds was that the flux flow must be varied with the depth of the V.

The tests indicated that the flexible conduit was introducing erratic operation. Accordingly, it was decided to eliminate the difficulty with the flexible conduit by eliminating the conduit altogether. The wire drive motor and a modified wire straightener were mounted immediately above the torch along with the coil of wire. Thus the torch drive motor and wire reel rotated around the stationary pipe as a single unit in a manner not previously accomplished in mechanized arc welding. This modified equipment was first tried on the welding of 10 in. diameter standard wall thickness pipe and found to be satisfactory.

In one method of operation the same flux rate and wire feed rate settings are used for the complete 360 deg. weld but the welding speed is changed from a faster welding speed going down from twelve to six o'clock to a slower speed when welding up from six to twelve o'clock. This speed change is desirable in order to properly control the molten puddle but it results in a smaller weld bead being deposited on the 180 deg. of the joint welded at the faster speed. However, this difference in weld bead size is compensated for by making the next pass in the opposite direction of rotation but using the same speed change sequence. Thus, succeeding passes are deposited in alternate rotational directions and at the end of every even numbered pass the deposited metal is uniformly distributed around the 360 deg. of the joint.

The technique of changing the rotational direction for each succeeding pass also serves, during the even numbered passes, to unwind the flux and water hoses and power cable from around the pipe where they had been carried on the preceding odd numbered passes.

At this point the only major difficulty experienced was that the wire hung-up in the guide tube occasionally. In an attempt to solve this, a number of felt wipers were installed to contact the wire immediately in front of the drive roll. These wipers eliminated the hang-up difficulty as long as they were clean. However, hang-ups of the wire still occurred at less frequent intervals. In an attempt to improve on this condition, the size of the wire contact tube was changed from 0.034 in. to 0.038 in. In order to ensure good position electrical contact with this larger tube, a slight reverse bend was introduced into the exit end of the tube. The larger tube diameter did not seem to have any appreciable effect in reducing the number of wire hang-ups. The wire hang-up difficulty was essentially eliminated by using very clean wire. The cleanliness of this new wire was indicated by the resulting condition of the felt wipers.

With equipment operating satisfactorily, tests were continued on 18 in. diameter pipe. The procedure used was to start at twelve o'clock and weld completely around the pipe so that the weld overlapped about 1 in. Successive passes were deposited in alternate directions. The first pass was good except for slight undercutting in the five to six o'clock position. This undercutting was related to welding speed.

The procedure involved welding down at a slightly faster rate than the speed used for up-welding. The undercutting was caused by too fast a welding speed; the second pass made with modified speeds was completely satisfactory. The third pass was deposited with the electrode offset from the center of the joint.

This weld was not completely satisfactory in the ten to twelve o'clock positions. The bead did not seem to be fluid enough. This was apparently caused by excessive flux. In successive welds, the effect of varied flux flows was studied and it was determined that, in the downhand positions, much less flux was necessary than for the remainder of the weld.

A satisfactory technique was ultimately developed wherein minimum flux setting was used for starting the weld in about the twelve o'clock position. As welding proceeded to the two o'clock position, flux flow was gradually increased to a setting which we found suitable for the up-welding.

It was found that the optimum amount of flux could almost completely eliminate sagging of the weld puddle in the down direction. However, these tests indicated that it would be desirable to use one flux setting for the complete weld if possible. An intermediate flux flow was established which was entirely satisfactory for the first four passes. However, on the fifth pass, one drip of weld metal formed in about the eight o'clock position while up-welding. This condition was immediately rectified by increasing the flux flow slightly. This condition indicated that considerably less flux could be used while depositing weld metal deep in the V groove, but that an increased amount of flux was necessary when the weld metal build up reached a point where it no longer was supported by the sides of the V. The dripped weld metal was chipped off and the hole filled so that the next pass would not be adversely affected. Two more passes were made successfully to complete the weld. Optimum bead spacing should permit making this weld in five or six passes with a minimum amount of reinforcement.

The precise reason why the process of the invention makes possible for the first time vertical-up welding is not known. A plausible explanation might be found in consideration of the physical fusing action in the welding puddle. For example, as is commonly known in the art of fusion welding, a continuous linear welding vertical seam can be deposited best by welding downward. The arc force itself is a factor (in vertical down-welding) which acts to hold the metal in place as the weld progresses downward. In such case, the welding operator inclines the electrode at a dragging angle so as to effectively exert the arc force on the puddle to provide control of the puddle so as to allow for solidification. During this control of the welding puddle, the operator must achieve a desirable edge condition so as to avoid undercutting. Vertical down-welding assists the operator in obtaining the desirable weld coalescence along the edges so as to produce the smooth blending-in of the weld deposit with the base metal which is so necessary to get a high-quality weld.

The control of the welding puddle achieved in vertical down-welding is not present in vertical up-welding. In this case, the arc forces cannot be used by the operator advantageously to "hold" the weld puddle in position. The tendency is for a higher-than-desirable crown to be formed while, at the same time, there is a tendency toward undercutting. It appears that the combination of elements have now, for the first time, provided a condition under which the weld puddle can be controlled in vertical up-welding and vertical down-welding.

The experimental flux No. 472—11 was made up in very small lots. It was decided to try a slightly larger particle size than the very fine size found unexpectedly successful. The thought was that the largest size should be used because larger particle size would cheapen the products. The first weld bead deposited in the bottom of the groove was, as usual, very good, but subsequent passes were not satisfactory.

The trouble with these welds were scalloped edges caused by the poor wetting action when welding in the down direction from twelve to one o'clock and slight undercutting with entrapment of slag from five to six o'clock welding up. These difficulties were eliminated by varying the flux-flow as previously described and by reducing the welding speed to permit better flux action to give better coalescence of weld metal.

The mechanism of successful bead deposition when welding in the up direction seems to be possible because of the interaction of several factors. The quantity of partially fused flux adhering to the finished bead is probably important, but can be overdone. Too much flux will not permit the fairing out of the weld metal so as to give a good bead contour. Furthermore, when a drip occurs, it often forms at a small distance behind the arc where the slag coating seems to have partially solidified.

This drip formation on partially solidified slag would indicate that an internal force is driving the metal out from a molten region.

A plausible explanation is that the chemical reaction between the flux and the molten metal has been delayed because the flux particle size was too large. The weld bead face becomes crusted over by partially solidified slag before the chemical reactions which evolve gas in the molten metal have gone to completion. This belatedly evolved gas in escaping forces an opening in the slag covering, and either carries molten bubbles of metal along or at least provides an opening through which the molten metal can drip. However, with an optimum amount of flux of the proper particle size, the chemical reaction can go to completion while the slag is still molten enough to permit complete evolution and escape of gases. To say this another way, dripping of the weld metal can be caused either by large flux particle size which does not permit rapid fluxing action, or by too small a quantity of flux to permit complete chemical reaction.

It has been said (Lapple, Charles E.—"Particle Technology and Its Role in Industry"—Proceedings—Tenth Meeting of the SRI Association—Stanford Research Institute, Menlo Park, California) that in particle technology we are concerned with the assemblage, dispensing, and use of discrete particles of matter wherein the nature and behavior of these particles becomes a controlling factor in their mode of utilization. Some processes depend to a major extent on the properties of the particles involved, as was found to be the case in the method of the invention.

There are three general kinds of particulate systems. The first is an accumulation of particles such as crystals, granulations, powders or ores. The particles may be of a given characteristic composition but of different size and shape; or they may be of different chemical compositions, and of different size or shapes. A second kind of particulate system is one in which the particles are suspended and conveyed in gases as in the subject invention. The particulates of this system may be solids, liquids or gases. Since the particulates of the subject invention are solids, they may be classed as dust.

In particle technology, there are different types of functions:

(1) Physical, chemical and electrical properties of the particle which are suspended in the shielding gas stream.

(2) The crushing, atomization, dispersion and conveyance of the particles and their suspensions.

(3) The disposition of particles from hopper to welding puddle.

(4) The size classification and separation of particles.

(5) The handling of particles and their suspensions such as in the flow of powders by magnetic conveyance, fluidization, and the like.

A phenomenon in the subject invention is that known as the Brownian movement in which very fine particles of low mass disperse more readily into the welding zone by their zig-zag motion.

Of importance is the deposition of the particles from the shielding gas into the welding zone. This deposition is caused by impacting a relatively high velocity flux-dust-laden stream onto the surface of the puddle.

With particles suspended in the gas stream, there is apparently no way of keeping these small particles from adhering to each other as they touch, with the possible exception (as was experienced in the course of the experimentations) that the shielding gas velocity must be of such magnitude as to control the direction of the particles in such manner as to overcome their attraction for each other.

The particulate size was found to be an important specification of the flux. It has been customary to define the size of the welding fluxes by screen analysis; however, it is now believed that more accurate methods of size specification are required to achieve the unexpected results of the invention. For example, conventional methods for measuring size actually measure some other property, and may not determine whether particles are of spherical or non-spherical geometry. As was indicated above, a specification screen mesh, based on a single size was found to be inadequate because such measurement contrasted little to the degree of uniformity.

The method of the invention increases the importance of proper flux distribution in that by so maintaining the particulate size distribution in the flux of the invention, new and improved welding results were obtained.

Emphasis is therefore placed on both the particulate size and the distribution of such particulates in the moving particulate mass, such distribution being controlled by the velocity of the shielding gas stream. Without proper control of the gas velocity, there seems to be a tendency of the particulates to agglomerate, in which case thousands of particles so clustered are transported with difficulty, and do not give full and proper fluxing action. It is therefore submitted that, by careful control of size, such close sizing contributes to unique properties of the flux itself and a substantially faster welding speed is achieved, while obtaining a high-quality weld.

Another interesting element of this invention is the positioning of the axis of the electrode with respect to the workpiece surface in this all-position welding. As has been previously described, it has been preferred to maintain the electrode at some angle of the electrode to the workpiece other than normal. For example, the electrode is usually maintained in a plane which is normal to the axis of the weldment such as the pipe. In this plane, the electrode may be either forwardly or rearwardly inclined depending upon the position of the welding puddle throughout 360° of operation. That is, the dragging angle would be preferred for vertical down-welding, whereas the leading angle would be preferable for vertical up-welding.

By maintaining the axis of the electrode in such a position that it bisects the circumference of the pipe the welding mechanism is much simplified. This single positioning of the electrode throughout its traverse of the pipe is submitted as being advantageous in the art. This single positioning of the electrode is made possible for the first time by the improved control of the puddle, and other features of the invention already described.

Since the up-welding from six to twelve o'clock was the critical stage, initial attempts involved an investigation of various leading angles on the welding torch with the idea in mind that the arc force would help to hold the molten metal in position. The benefit contained in the leading electrode angle was submerged by other factors in the welding operation. However, by the time all the difficulties had been solved, it was found that the angular position of the torch was not critical. The process apparently works well with either a slight leading or slight lagging angle. Since it is simpler to use a one-angle torch setting, it is desirable to have the wire axis fixed so that it always bisects the circumference of the pipe, that is to say the wire axis always passes through the pipe axis.

Typical welding conditions:
    Welding current_____ 190 amp.
    Polarity _____ Electrode positive.
    Arc voltage_____ 31 volts.
    Welding speeds—
        Up_____ 20 in./min.
        Down_____ 30 in./min.
Wire:
    Grade_____ Oxweld 43.
    Diameter_____ 0.030 in.
    Extension from contact tube____ ⅞ in.
    Cup-to-work distance_____ ¾ in.

Flux:
- Experimental _____ No. 472—11.
- Size _____ 32 x D.
- Density _____ {2.42 g./cc. (packed). 2.16 g./cc. (loose).
- Flux consumption per pound of wire melted—
    - Pass No. 1 and 2 _____ 0.9 lb.
    - Pass No. 3 and 4 _____ 1.1 lb.
- Average velocity of shielding gas _____ 7.2 ft./sec. ±5%.
- Average velocity of mixture of gas and flux _____ 7.1 ft./sec. ±5%.
- Average velocity of flux _____ 6.8 ft./sec. ±5%.
- Shielding gas flow _____ 54.2–55.2 ft.$^3$/hr.
- Flux flow _____ 67.3–68.2 grams/min.

A determination was made of the particle size and shape, particle size distribution, and surface area of samples identified by number as 472—11, 32 x D and 472—11, 48 x D, both samples of the following chemical composition in weight percent.

| | |
|---|---|
| Calcined Mn ore 48 x D | 4.8 |
| Rutile as received 65 x D | 38.5 |
| Periclase as received 48 x D | 9.5 |
| Aluminum oxide as received 32 x D | 18.9 |
| Cryolite as received 250 x D | 4.8 |
| Ferrosilicon (50% Si) 48 x D | 11.1 |
| Low carbon ferromanganese 48 x D | 11.1 |
| Sodium silicate _____ (solid) | 1.3 |
| | 100.0 |

The flux was made by placing the first seven dry materials in a kneader-type mixing machine. After five minutes of dry mixing, the eighth material, sodium silicate solution, was added. Sodium silicate solution is a binder. After 15 minutes the binder was dispersed throughout the mix. The bonded mix then was removed from the mixer and was dried in an oven. Drying removes water from the binder so that all particles are firmly bonded together by a solid film of sodium silicate. The dried mix was finally pulverized to the desired grain size.

The selection of the components of the flux and their percentage was important. The principal ingredient of the flux was rutile, which aids in providing a quiet welding arc and a slag of requisite moldability. Periclase and aluminum oxide assisted in providing a slag that was easy to remove after welding. The function of cryolite was to provide a favorable surface tension for removal of gases evolved in the weld metal during welding. Ferrosilicon was a convenient deoxidizer. The two sources of manganese, ore and ferromanganese produce a weld metal of sufficient manganese content to resist hot cracking during welding.

The size analysis of Sample 472—11, 48 x D was made by screening through nested sieves with apertures ranging from 48 mesh to 400 mesh. The —400-mesh fraction was sized with a Haultain infrasizer. The size distribution obtained by screening and infrasizing is shown in column 3 below. Due to the particle shape and density of the material, it was necessary to adjust the size distribution obtained by the infrasizer in order to establish the correct size of the particles reporting in each cone. The adjusted size distribution is given in column 4. The adjustment was made on the basis of microscopic measurements of the particle size of the —400-mesh fraction. These measurements showed that the material reporting in cone 1 should be included with the 200 x 270-mesh fraction, and the material in cone 2 should be included in the 270 x 400-mesh fraction.

*Sizing analyses*

| Size | Sample 472—11 32 x D, Percent Weight | Sample 472—11 48 x D, Percent Weight | |
|---|---|---|---|
| | | Original | Adjusted |
| +35 mesh | 3.7 | | |
| 35 x 48 | 11.9 | 1.2 | 1.2 |
| 48 x 65 | 18.4 | 4.4 | 4.4 |
| 65 x 100 | 28.0 | 22.9 | 22.9 |
| 100 x 150 | 27.1 | 41.4 | 41.4 |
| 150 x 200 | 5.8 | 11.8 | 11.8 |
| 200 x 270 | 2.0 | 5.1 | 5.3 |
| 270 x 400 | 2.0 | 5.7 | 7.4 |
| 400 x Down | 1.1 | | |
| | 100.0 | | |

| Size | Sample 472—11 48 x D, Percent Weight | |
|---|---|---|
| | Original | Adjusted |
| Infrasizer (48 x D only) | | |
| Cone 1 (74 x 53 micron) | 0.2 | |
| Cone 2 (53 x 37 micron) | 1.7 | |
| Cone 3 (37 x 26 micron) | 2.2 | 2.2 |
| Cone 4 (26 x 18 micron) | 1.1 | 1.1 |
| Cone 5 (18 x 13 micron) | 0.6 | 0.6 |
| Cone 6 (13 x 9 micron) | 0.3 | 0.3 |
| Cone 7 (9 x Down micron) | 1.4 | 1.4 |
| | 100.0 | 100.0 |

The surface areas of the two samples which gave satisfactory performance were measured by the BET method using krypton as the adsorbing gas and are listed below:

472—11, 32 x D percent weight loss due to activation=0.1%.
Surface area=2,390 cm.$^2$/g.
472—11, 48 x D percent weight loss due to activation=0.2%.
Surface area=2,650 cm.$^2$/g.

As to the particular class of welding process involved in this invention, it should be understood that the problems discussed herein are confined to a shielding-gas-borne-flux consumable metal electrode arc welding method. The shielding gas employed in the process may be carbon dioxide, argon, helium, oxy-argon, or oxy-helium, or mixtures thereof.

What is claimed is:

1. Circumferential all-position gas-flux shielded metal arc pipe welding apparatus, comprising the combination of a gas-flux shielded metal arc welding torch, carriage for said torch, means for guiding said carriage around the pipe to be welded with the extended longitudinal axis of the torch substantially intersecting the axis of such pipe, means for feeding a fusible metal wire electrode through such torch including a flux feed motor for feeding fluidized welding composition powder in a suitable shielding gas stream through such torch, and around such wire electrode, and means for controlling the speed of said carriage in predetermined arcs in its course about the pipe so that it moves at a faster rate when moving down compared to going up around the pipe.

2. Circumferential all-position gas-flux shielded metal arc pipe welding apparatus, comprising the combination of a gas-flux shielded metal arc welding torch, carriage for said torch, means for guiding said carriage around the pipe to be welded with the extended longitudinal axis of the torch substantially intersecting the axis of such pipe, means for feeding a fusible metal wire electrode through such torch including a wire feed motor mounted on said carriage, means including a flux feed motor for feeding fluidized welding composition powder in a suitable shielding gas stream through such torch, and around such wire electrode, and means for changing the speed of said flux feed motor to change the amount of welding composition that is fed to said torch at selected points in the travel of the latter.

3. Circumferential all-position gas-flux shielded metal arc pipe welding apparatus, comprising the combination of a gas-flux shielded metal arc welding torch, carriage for said torch, means for guiding said carriage around the pipe to be welded with the extended longitudinal axis of the torch substantially intersecting the axis of such pipe, means for feeding a fusible metal wire electrode through such torch including a wire feed motor mounted on said carriage, means including a flux feed motor for feeding fluidized welding composition powder in a suitable shielding gas stream through such torch, and around such wire electrode means including carriage drive motor for moving said carriage around said pipe, and means for controlling the speed of said carriage in predetermined arcs in its course about the pipe so that it moves at a faster rate when moving down compared to going up around the pipe, and means for changing the speed of said flux feed motor to change the amount of welding composition that is fed to said torch at selected points in the travel of the latter.

4. Process of all-position welding a circular workpiece, which comprises striking a welding arc between a fusible metal electrode and such workpiece, said arc being energized through suitable cables, while shielding such arc with gas-borne powdered welding composition, supplied through suitable hose, moving said electrode completely about such workpiece and simultaneously feeding the electrode toward such arc in the direction of the longitudinal axis thereof, supplying such electrode from a reel that is also similarly moved about the workpiece therewith, upon the completion of such movement stopping the operation, cleaning slag from the resulting weld, striking a welding arc between said fusible metal electrode and such weld, and repeating the welding operation in reverse by moving said electrode reel completely about said workpiece in a direction opposite that of the first weld, thereby unwinding the connecting cables and hose while completing a second welding pass.

5. Process of welding defined by claim 4, in which the movements of the welding electrode about the workpiece are maintained at a constant preselected speed in each direction.

6. Process of welding as defined by claim 4 in which each directional movement of said electrode downwardly about the workpiece is maintained at a constant preselected speed until the weld reaches about the bottom of the workpiece, whereupon such movement is changed to a constant preselected speed that is substantially less than that maintained in such downward movement.

References Cited in the file of this patent

UNITED STATES PATENTS

| | | |
|---|---|---|
| 1,872,114 | Burnish | Aug. 16, 1932 |
| 2,013,630 | Goldsborough | Sept. 3, 1935 |
| 2,265,954 | Quartz | Dec. 9, 1941 |
| 2,694,023 | Hopkins | Nov. 9, 1954 |
| 2,727,125 | Muller | Dec. 13, 1955 |
| 2,795,689 | McNutt | June 11, 1957 |
| 2,807,562 | Shrubsall | Sept. 24, 1957 |

FOREIGN PATENTS

| | | |
|---|---|---|
| 1,146,657 | France | May 27, 1957 |